United States Patent [19]

Tanaka

[11] Patent Number: 5,777,784

[45] Date of Patent: Jul. 7, 1998

[54] REFLECTING ILLUMINATION OPTICAL SYSTEM FOR MICROSCOPES

[75] Inventor: Takaaki Tanaka, Hachioji, Japan

[73] Assignee: Olympus Optical Co., Ltd., Tokyo, Japan

[21] Appl. No.: 219,927

[22] Filed: Mar. 30, 1994

[30] Foreign Application Priority Data

Mar. 31, 1993 [JP] Japan .................................. 5-074462

[51] Int. Cl.⁶ .......................... G02B 21/06; G03B 13/06
[52] U.S. Cl. .................... 359/388; 359/381; 359/385; 359/432
[58] Field of Search ............................. 359/380–389, 359/390, 362, 363, 368, 421–422, 432; 351/204–212

[56] References Cited

U.S. PATENT DOCUMENTS

| | | | |
|---|---|---|---|
| 3,464,760 | 9/1969 | Laures | 359/362 |
| 3,799,645 | 3/1974 | Stankewitz | 359/388 |
| 3,813,172 | 5/1974 | Walker et al. | 359/381 |
| 4,148,552 | 4/1979 | Suzuki et al. | 359/388 |
| 4,284,327 | 8/1981 | Kesaft et al. | 359/388 |
| 4,397,529 | 8/1983 | Taira | 359/381 |
| 4,687,304 | 8/1987 | Piller et al. | 359/388 |
| 4,852,985 | 8/1989 | Fujihara et al. | 359/387 |
| 5,325,231 | 6/1994 | Tamura et al. | 359/387 |

FOREIGN PATENT DOCUMENTS 62-294215  12/1987  Japan .

OTHER PUBLICATIONS

Inoue, Everything about Microscope, Chijin Shokan Co., Ltd, Apr. 1, 1977, pp. 36–38, partial English translation.

*Primary Examiner*—Thong Nguyen
*Attorney, Agent, or Firm*—Cushman, Darby & Cushman IP Group of Pillsbury, Madison & Sutro LLP

[57] ABSTRACT

A reflecting illumination optical system for microscopes has a light source, a lamp house section including a collector lens with a focal length corresponding to the light source, and a reflecting projection tube section including a projection optical system for projecting the image of the light source at a position adjacent to the pupil of an objective lens. Further, a variable magnification section composed of a nearly afocal variable magnification lens unit is removably inserted between the reflecting projection tube section and the lamp house section, or in the interior of the reflecting projection tube section. Thus, when the lamp house section is replaced by another, the magnification of projection of the light source at the position adjacent to the pupil of the objective lens can be changed.

12 Claims, 4 Drawing Sheets

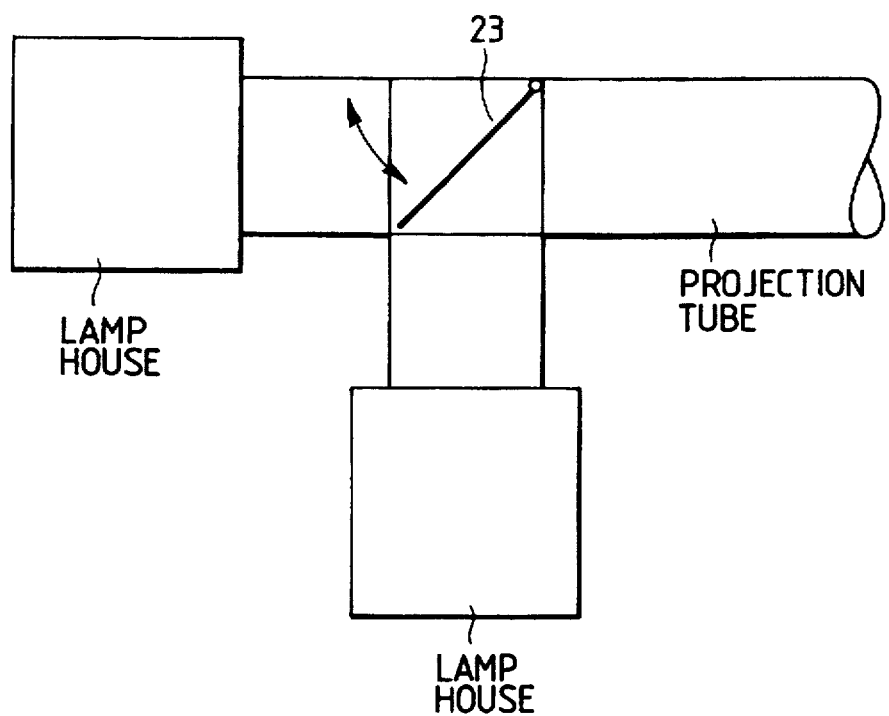

REFLECTING ILLUMINATION OPTICAL SYSTEM FOR MICROSCOPES

BACKGROUND OF THE INVENTION

1. Field of the Invention

This invention relates to a reflecting illumination optical system for microscopes.

2. Description of the Related Art

In general, reflecting illumination optical systems for microscopes of the type fall roughly into two classes, bright and dark field reflecting illumination optical systems for metallurgical microscopes and reflecting fluorescence illumination optical systems relating to biological specimens.

Of these classes, the bright and dark field reflecting illumination optical system used in metallurgical microscopes employs the arrangement by which the so-called reflecting Köhler illumination can be obtained in such a manner that an optical image is formed adjacent to the pupil of an objective lens. A choice between bright field reflecting illumination and dark field reflecting illumination, described here, is exercised by switching a part of optical members located on the objective side. In the bright and dark field reflecting illumination optical system, an aperture stop and a field stop are disposed so that the numerical aperture (NA) of illumination and an illumination field can be adjusted. In this case, it is the best condition in practical use that the magnification of projection of an image of a light source on the objective pupil is set so that the source image is nearly circumscribed about the objective pupil. Thus, for example, when an ordinary halogen lamp of about 100 W is used as the light source, a value of projection magnification, although dependent on the size of the light source applied, is set to about 3×.

In the reflecting fluorescence illumination optical system, by contrast, a light source applied is an arc lamp source as it is usually called, which is very small in size itself and requires the NA to be increased on the source side for brighter illumination. Hence, it is common practice to set the projection magnification of the light source, relatively high for example, when an ordinary mercury arc lamp of about 100 W is used, a value of the magnification is set to approximately 10×.

That is, conventional reflecting illumination optical systems for microscopes require different types of light sources to be used in accordance with the types and applications of microscopes to which the optical systems are applied, and thus are designed to derive the optimum magnification of projection in conformity to the applications. As a consequence, it can be said that the conventional reflecting illumination optical systems involve arrangements which differ radically from one another.

Where the conventional reflecting illumination optical systems are separately applied to corresponding microscopes are to construct illumination means for these microscopes, two kinds of reflecting projection tubes are required in accordance with types and applications of these microscopes. From the viewpoint of the system or cost of the microscope itself, it is desirable that the reflecting projection tube is limited to only one kind for use. In the conventional reflecting illumination optical systems, however, as mentioned above, their arrangements vary with the projection magnifications of light sources, thus making it difficult to limit the reflecting projection tube to only one kind. This difficulty is chiefly attributed to the dimensions of light sources applied and the emission characteristics, namely the so-called effective radiation angles, of the light sources, notably of arc lamps.

Specifically, for the halogen lamp generally used in the bright and dark field reflecting illumination optical system mentioned above, the dimension of its source filament is nearly several millimeters x several millimeters, which is relatively large, while for the mercury arc lamp generally used in the reflecting fluorescence illumination optical system, the diameter of its emission part is nearly 0.2 mm, which is relatively small. The size of the pupil on the objective side is approximately 1014 14 mm in diameter relative to the objective lens on the low magnification side and is much smaller on the high magnification side. Consequently, the projection magnification of the light source is set so that the size of the image of the light source corresponds to the pupil diameter of the objective lens on the low magnification side.

If, therefore, the mercury arc lamp whose emission part dimension is relatively small is mounted to the reflecting projection tube for the halogen lamp whose source filament dimension is greater, the projected image of the light source will not correspond to the pupil diameter of the objective lens on the low magnification side, with the resultant NA shortage of illumination. Conversely, when the halogen lamp whose source filament dimension is relatively great is mounted to the reflecting projection tube for the mercury arc lamp whose emission part dimension is smaller, the projection magnification is excessively high, with the result that the pupil diameter of the objective lens on the high magnification side becomes smaller than the line spacing of the filament and good illumination cannot be brought about.

Thus, as a means of removing this drawback, lamp houses are provided, each of which incorporates a light source according to the type and application required for the systematic arrangement of the reflecting illumination optical system and a collector lens of focal length set in compliance with the light source. By using to be used with it the lamp houses each in its proper way, it is considered in principle that the drawback can be overcome with comparative ease. In practice, however, it is difficult to derive a practical arrangement in this way for reasons which will appear below.

Here, when the magnification of projection of a light source on an aperture stop is denoted by $m_1$ and the magnification of projection of the aperture stop on the pupil of an objective lens by $m_2$, a magnification m of projection of the light source on the pupil of the objective lens is given by $m=m_1 \times m_2$. In this case, the magnification $m_2$ is first determined beforehand as the optimum value by the restriction of the mechanism and consequently, the entire projection magnification m is uniquely found by the value of the magnification $m_1$. As mentioned above, when the halogen lamp is used as a light source, the projection magnification m÷3, while when the mercury arc lamp is used, the projection magnification m÷10. Thus, in order to make up the difference of magnification given by the ratio between both projection magnifications, $1\%+3.3$, by using the collector lens, it is necessary only that the relation between both can be expressed by $f_2=(1/3.3)f_1$, where $f_1$ is the focal length of the collector lens for the halogen lamp and $f_2$ is the focal length of the collector lens for the mercury arc lamp.

The collector lens for the halogen lamp is usually configured as a single aspherical lens and, in practical use, the focal length $f_1$ is set at nearly 24–26 mm. Hence, the value of the focal length $f_2$ of the collector lens for the mercury arc lamp can be determined from the above equation to be nearly 7.3–7.9 mm. In the application of the mercury arc lamp, however, since the diameter of its shield glass is on the order of ten millimeters, a normal distance between the light source and the collector lens could not be maintained unless an extreme retrofocus lens system is employed as the collector lens for the mercury arc lamp. In practice, for instance, even where an attempt is made to use a plurality of lenses for correction for chromatic aberration its realization is very difficult. Even if the realization were made, rises in costs would be caused.

After all, it is seen that provision for varying the focal lengths of the collector lenses which are respectively combined with two kinds of light sources makes it difficult to provide two modes of illumination using the reflecting projection tube in common, and is disadvantageous for costs.

SUMMARY OF THE INVENTION

It is, therefore, an object of the present invention to provide a reflecting illumination optical system for microscopes which allows the best illumination, with only one kind of reflecting projection tube, relative to a bright and dark field reflecting illumination mode using a halogen lamp and a reflecting fluorescence illumination mode using a mercury arc lamp.

In order to achieve this object, the reflecting illumination optical system for microscopes according to the present invention is at least provided with a lamp house section including a light source and a collector lens of focal length set in compliance with the light source and a reflecting projection tube section including a projection optical system for projecting the image of the light source at a position adjacent to the pupil of an objective lens. The lamp house section can be replaced with another lamp house section having a different light source. Further, a variable magnification section composed of a nearly afocal variable magnification lens unit is inserted between the reflecting projection tube section and the lamp house section, or in the interior of the reflecting projection tube section, and is removably disposed. Thus, the replacement of the lamp house section with another causes a change in magnification of projection of the light source at the position adjacent to the pupil of the objective lens.

In this way, even where light sources which differ from each other are used as reflecting illumination sources for microscopes, the reflecting projection tube section can be used in common.

This and other objects as well as the features and advantages of the present invention will become apparent from the following detailed description of the preferred embodiments when taken in conjunction with the accompanying drawings.

BRIEF DESCRIPTION OF THE DRAWINGS

FIG. 9 shows still another structure allowing the replacement of lamp houses.

DETAILED DESCRIPTION OF THE PREFERRED EMBODIMENTS

Referring to FIGS. 1 to 6, the embodiments of the reflecting illumination (vertical illumination) optical system for microscopes according to the present invention will be explained in detail below.

Figure 1:
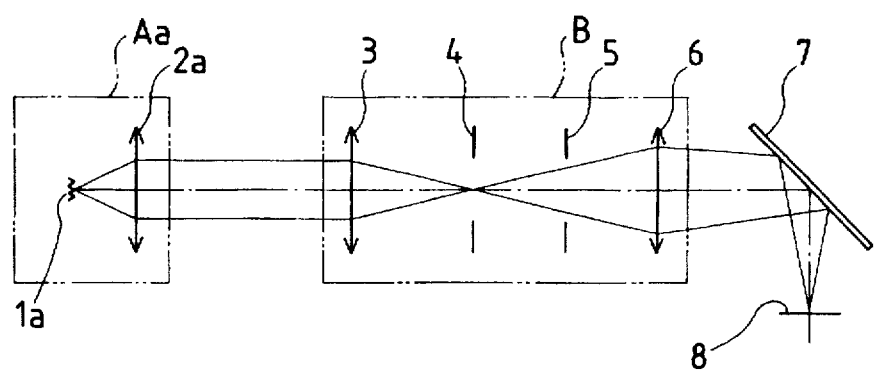
FIG. 1 is an explanatory view of an arrangement in a state where a variable magnification unit is not inserted in a system showing in principle the concept of a reflecting illumination optical system for microscopes applied to one embodiment of the present invention.
Figure 2:
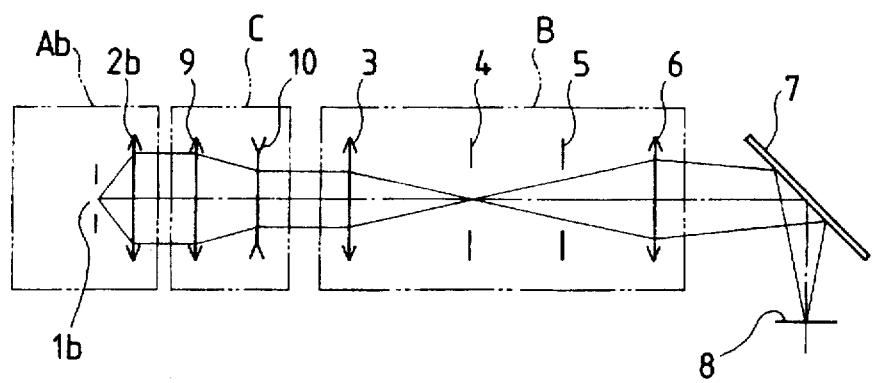
FIG. 2 is an explanatory view of an arrangement in a state where the variable magnification unit is inserted in the system of FIG. 1.

In FIG. 1, the reflecting illumination optical system for microscopes according to the present invention has a lamp house section Aa composed of a light source 1a using a halogen lamp and a collector lens 2a a making a light beam from the light source 1a nearly parallel. In FIG. 2, the optical system includes a lamp house section Ab composed of a light source 1b employing a mercury arc lamp and a collector lens 2b making a light beam from the light source 1b nearly parallel. Further, a reflecting projection tube section B is disposed which comprises a positive lens 3 having the behavior that a parallel beam having passed through the collector lens 2a or 2b is converged to form a secondary source image and a positive lens 6 which, after the beam traverses an aperture stop 4 and a field stop 5 which are disposed according to the application, as necessary, to adjust the numerical number of illumination and the illumination field, projects the secondary source image, through a half mirror or a dichroic mirror 7, at a position adjacent to a pupil 8 of the objective lens. Moreover, in FIG. 2, for the lamp house section Ab, a variable magnification section C is provided which includes a nearly afocal variable magnification lens unit having a positive lens 9 on the side of the light source 1b and a negative lens 10 on the side of the pupil 8 of the objective lens. The variable magnification section C is inserted between the collector lens 2b and the positive lens 3 and is removably disposed, thereby changing the magnification of projection of the light source on the pupil 8 of the objective lens.

In this embodiment, the lamp house section Aa or Ab and the projection tube section B constitute the reflecting illumination optical system. This is because this arrangement is effectively simplified to have a systematic advantage. The light sources 1a and 1b and the collector lenses 2a and 2b are incorporated in the corresponding lamp house sections Aa and Ab. It is for this reason that when the light source 1a or 1b needs to be replaced in response to the purpose of microscopy, the collector lens 2a or 2b can also be replaced at the same time by replacing the lamp house section Aa or Ab as it is. In this case, setting the focal length of the collector lens 2b for the mercury arc lamp smaller than that of the collector lens 2a for the halogen lamp is preferable, because such configuration does not require the afocal variable magnification lenses 9 and 10 in the variable magnification section C to have an extremely high magnification power and thus the apparatus can be made compact.

In the above-mentioned embodiment, therefore, the reflecting projection tube section B in the reflecting illumination optical system for microscopes can be used in common in combination with the variable magnification section C, no matter whether a light source is the source 1a or 1b. Thus, the simplification of the reflecting illumination optical system, namely of the microscope system itself, is accomplished and brings about an advantage in cost.

Figure 3:
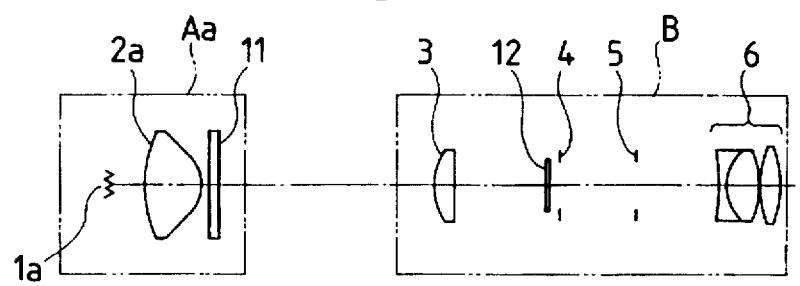
FIG. 3 is a sectional view in a state where the variable magnification unit is not inserted in a system showing the outline of a specific lens arrangement based on an actual design example in the embodiment of the present invention.
Figure 4:
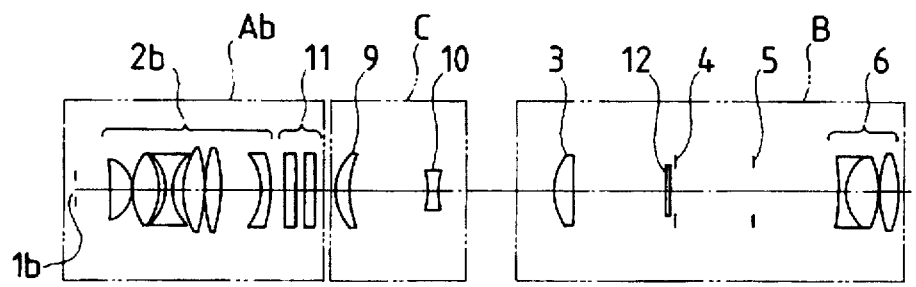
FIG. 4 is a sectional view in a state where the variable magnification unit is inserted in the system of FIG. 3.

FIGS. 3 and 4 diagrammatically show specific lens arrangements of the embodiment, using the halogen lamp and the mercury arc lamp, respectively. In these figures, reference numeral 11 represents a heat absorbing glass plate and 12 represents a removable diffusing plate.

Fundamental data in the lens arrangements of this embodiment are shown below.

Focal length of collector lens 2a for halogen lamp 26

Focal length of collector lens 2b for mercury arc lamp 19

Magnification by afocal variable magnification lenses 9 and 10 2.44×

For the afocal variable magnification lenses 9 and 10 in the variable magnification section C, it is only necessary to have the behavior of varying the projection magnification in forming the secondary source image. Hence, the location of the variable magnification section C is not necessarily limited to the position between the collector lens 2b of the lamp house section Ab and the positive lens 3 of the reflecting projection tube section B, as shown in FIG. 2; if for example plural lenses, constitute the positive lens 3 of the reflecting projection tube section B the variable magnification section C may be disposed between these lenses included in the positive lens 3. The functions and effects of both the arrangements are almost the same.

Figure 5:
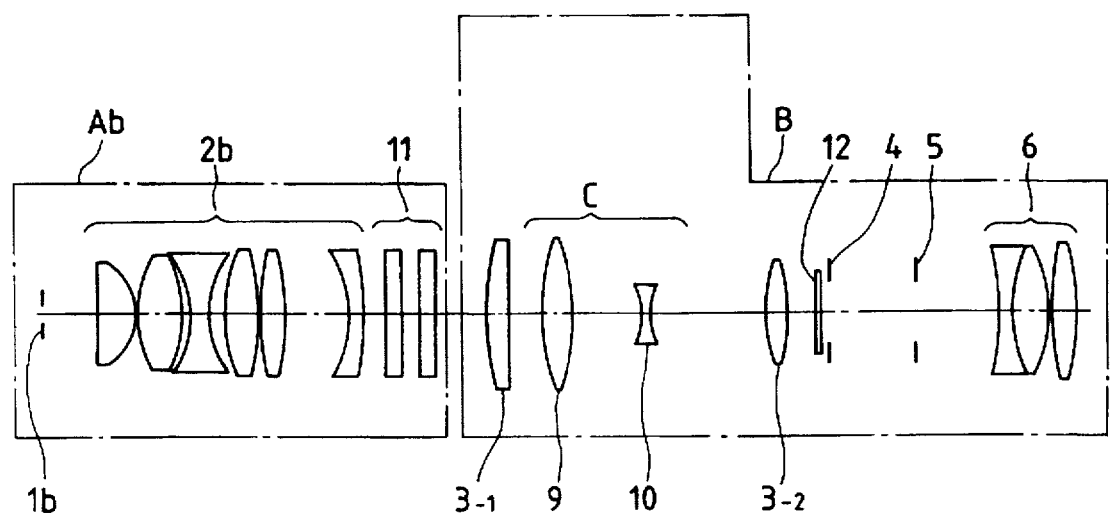
FIGS. 5 and 6 are sectional views showing arrangements where the variable magnification unit is incorporated in a projection tube in another embodiment of the present invention.
Figure 6:
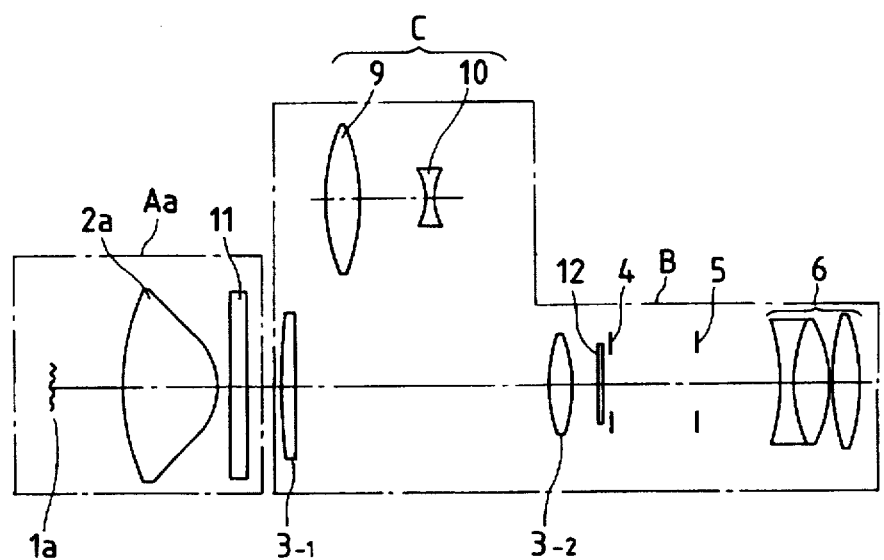

FIGS. 5 and 6 show another embodiment in which the variable magnification section C is housed in the projection tube section B. In this embodiment, the variable magnification section C is disposed so that it can be inserted (see FIG. 5) and removed (see FIG. 6), according to the lamp house used, between positive lenses 3-1 and 3-2.

Fundamental data in the lens arrangements of this embodiment are shown below.

Focal length of collector lens 2a for halogen lamp 26

Focal length of collector lens 2b for mercury arc lamp 19

Magnification by afocal variable magnification lenses 9 and 10 2.28×

Figure 7:
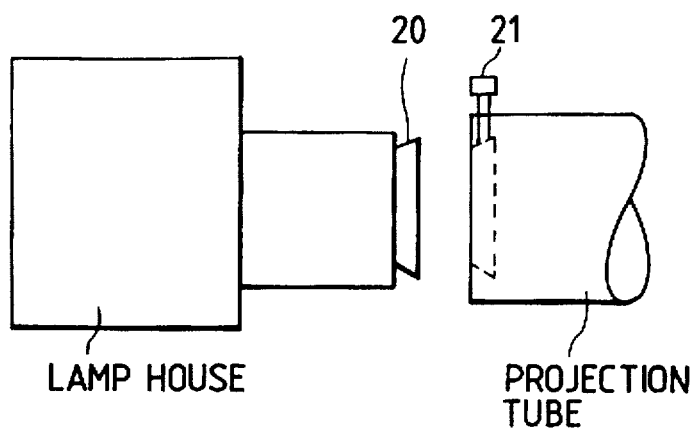
FIG. 7 illustrates a structure allowing the replacement of lamp houses.
Figure 8A:
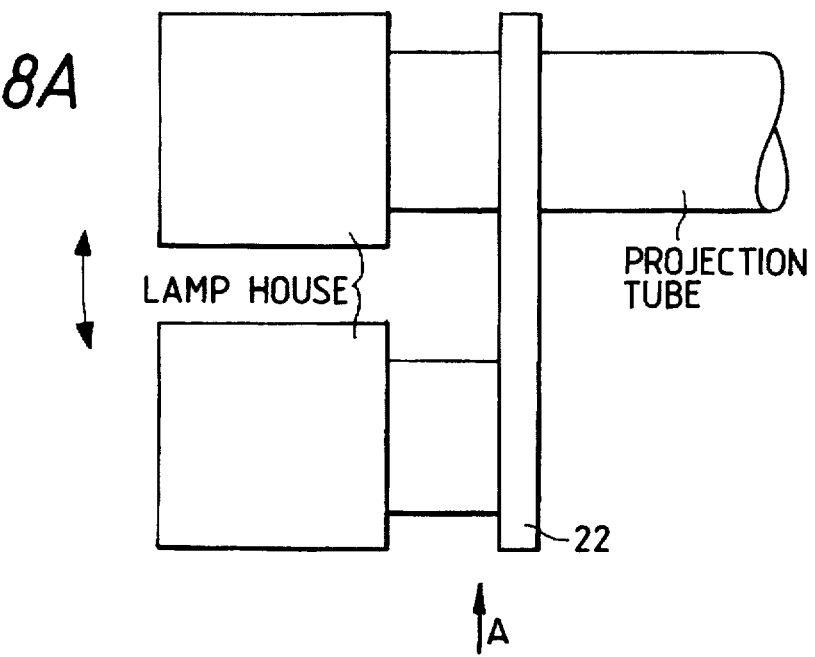
FIGS. 8A and 8B illustrate another structure for replacement of lamp houses, where 8B is a view taken in a direction of the arrow A in FIG. 8A.
Figure 8B:
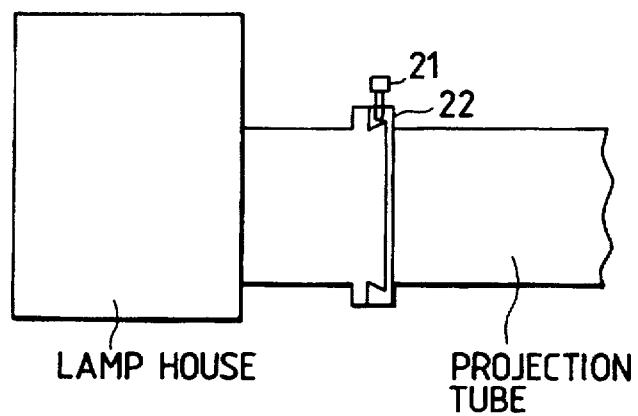

In the embodiments which have been mentioned above, means of replacing one lamp house with another are shown in FIGS. 7, 8A, 8B (which is a side view from arrow A of FIG. 8A), and 9. FIG. 7 shows that the replacement is made by a round dovetail 20 and a clamp screw 21, FIG. 8A and 8B by a slide dovetail 22 and the clamp screw 21, and FIG. 9 by the switchover of a mirror 23. These replacing means are applicable, no matter whether the variable magnification section C is independent or is incorporated in the projection tube section B. The combination of the means may well be used.

What is claimed is:

1. A reflecting illumination optical system for microscopes, comprising:

a reflecting projection tube section including a projection optical system for projecting an image of a light source disposed therebefore, at a position adjacent to a pupil of an objective lens of a microscope;

a first lamp house section having a first light source and a first collector lens, said first lamp house section being selectively settable before said reflecting projection tube section;

a second lamp house section having a second light source different from said first light source in size and a second collector lens, said second lamp house section being selectively settable before said reflecting projection tube section in place of said first lamp house section; and a variable magnification section including a substantially afocal variable magnification lens unit, said variable magnification section being selectively insertable in and removable from an optical path at a position after one of said first lamp house section and said second lamp house section set in place before said reflecting projection tube section, said position of said variable magnification section being before an optical element disposed nearest to the pupil of the objective lens, of said reflecting projection tube section, said variable magnification section allowing a change in magnification of projection of the image of the light source disposed before said reflecting projection tube section, said image being projected at said position adjacent to the pupil of the objective lens of the microscope, so that an optimum magnification of projection of the image of the light source disposed before said reflecting projection tube section is attained, with said image being projected at said position adjacent to the pupil of said objective lens by inserting or removing said variable magnification section in or out of the optical path at each time said first lamp house section and said second lamp house section are replaced by each other.

2. A reflecting illumination optical system according to claim 1, wherein said variable magnification section is insertable in the optical path at a position inside said reflecting projection tube section and removable therefrom.

3. A reflecting illumination optical system according to claim 1, wherein said first light source is a halogen lamp, said second light source is a mercury arc lamp, and said reflecting projection tube section includes an aperture stop.

4. A reflecting illumination optical system for microscopes, comprising:

illumination generating means including a plurality of light sources different from one another in size and source selecting means for selecting one light source from among said plurality of light sources;

a reflecting projection tube section including a projection optical system for projecting an image of a light source selected by said source selecting means at a position adjacent to a pupil of an objective lens of a microscope; and a variable magnification section including a substantially afocal variable magnification lens unit, said variable magnification section being selectively insertable and removable at a position between said illumination generating means and an object to be illuminated, so that magnification of projection of the image of said selected light source at the position adjacent to the pupil of said objective lens is changeable to an optimum value for said selected light source by inserting or removing said variable magnification section.

5. A reflecting illumination optical system according to claim 4, wherein said variable magnification section is insertable in a position between said illumination generating means and said reflecting projection tube section and removable therefrom.

6. A reflecting illumination optical system according to claim 5, wherein said illumination generating means further includes collector lenses to be used in combination with respective ones of said plurality of light sources, said collector lenses being disposed between said source selecting means and respective ones of said plurality of light sources, and a collector lens to be used in combination with a relatively small light source of said plurality of light sources different from one another in size has a shorter focal length than that of another collector lens to be used in combination with another light source larger than said relatively small light source.

7. A reflecting illumination optical system according to claim 6, wherein said relatively small light source is a mercury arc lamp, said another light source larger than said relatively small light source is a halogen lamp, and said reflecting projection tube section includes an aperture stop.

8. A reflecting illumination optical system according to claim 4, wherein said variable magnification section is insertable in a position inside said reflecting projection tube section and removable therefrom.

9. A reflecting illumination optical system according to claim 8, wherein said illumination generating means further includes collector lenses to be used in combination with respective ones of said plurality of light sources, said collector lenses being disposed between said source selecting means and respective ones of said plurality of light sources, and a collector lens to be used in combination with a relatively small light source of said plurality of light sources different from one another in size has a shorter focal length than that of another collector lens to be used in combination with another light source larger than said relatively small light source.

10. A reflecting illumination optical system according to claim 9, wherein said relatively small light source is a mercury arc lamp, said another light source larger than said relatively small light source is a halogen lamp, and said reflecting projection tube section includes an aperture stop.

11. A reflecting illumination optical system according to claim 4, wherein said illumination generating means further includes collector lenses to be used in combination with respective ones of said plurality of light sources, said collector lenses being disposed between said source selecting means and respective ones of said plurality of light sources, and a collector lens to be used in combination with a relatively small light source of said plurality of light sources different from one another in size has a shorter focal length than that of another collector lens to be used in combination with another light source larger than said relatively small light source.

12. A reflecting illumination optical system according to claim 11, wherein said relatively small light source is a mercury arc lamp, said another light source larger than said relatively small light source is a halogen lamp, and said reflecting projection tube section includes an aperture stop.

* * * * *